(12) United States Patent
Erhart

(10) Patent No.: US 7,974,268 B2
(45) Date of Patent: Jul. 5, 2011

(54) INTERNET TRUNKING PROTOCOL

(75) Inventor: Wesley Erhart, McKinney, TX (US)

(73) Assignee: Genband US LLC, Plano, TX (US)

( * ) Notice: Subject to any disclaimer, the term of this patent is extended or adjusted under 35 U.S.C. 154(b) by 2115 days.

(21) Appl. No.: 10/674,141

(22) Filed: Sep. 29, 2003

(65) Prior Publication Data

US 2005/0068941 A1    Mar. 31, 2005

(51) Int. Cl.
*H04L 12/28*    (2006.01)
*H04L 12/66*    (2006.01)

(52) U.S. Cl. ........................... 370/352; 370/356

(58) Field of Classification Search .................. 455/408; 370/352, 356
See application file for complete search history.

(56) References Cited

U.S. PATENT DOCUMENTS

| | | | |
|---|---|---|---|
| 5,241,533 A * | 8/1993 | Kimoto et al. | 370/227 |
| 6,721,334 B1 * | 4/2004 | Ketcham | 370/473 |
| 7,088,737 B1 | 8/2006 | Carrel | |
| 2003/0112788 A1 | 6/2003 | Erhart et al. | |
| 2003/0125013 A1 * | 7/2003 | Mizell et al. | 455/408 |
| 2004/0233933 A1 * | 11/2004 | Munguia | 370/473 |

* cited by examiner

*Primary Examiner* — Rasha S Al Aubaidi
(74) *Attorney, Agent, or Firm* — Jenkins, Wilson, Taylor & Hunt, P.A.

(57) ABSTRACT

A method and system for efficient voice transmission over internet protocol networks is provided. A first node detects a next node, and a channel is created between the first node and the next node. A first packet is received at the first node and the protocol of the first packet is detected. The first packet is merged with a second packet having the same protocol as the first packet, and the merged first packet and second packet are transmitted to the next node via the channel.

15 Claims, 8 Drawing Sheets

INTERNET TRUNKING PROTOCOL

BACKGROUND

The invention relates in general to packet networks, and in particular to a method and system for efficient transmission of voice and data over internet protocol networks.

Wireless communication networks provide the ability for one or more wireless or mobile nodes (generically "mobile units") to communicate with other mobile units or other nodes connected to wireless and/or wired networks. There are generally two types of wireless communication networks: circuit-switched and packet-switched.

Circuit-switched wireless communication networks typically include one or more Mobile Switching Centers (MSCs) for connecting to other switching centers and other networks, including the landline Public Switched Telephone Network (PSTN). Typical call control protocols in a circuit-switched network include ISUP (ISDN User Part) and Feature Group D.

Packet-switched wireless communication networks typically include a plurality of call servers and Media Gateways (MGs). SIP (Session Initiation Protocol) and BICC (Bearer Independent Call Control) are examples of call control protocols used in a packet-switched network.

The current approach to introducing packet based (e.g. Internet Protocol) multimedia services for wireless communication networks such as Universal Mobile Telecommunications Service (UMTS), Global System for Mobile Communications (GSM) and Code Division Multiple Access (CDMA) is to define an IP Multimedia Subsystem (IMS). IMS includes a plurality of IP-connected network entities using packet-switched services. These network entities provide IP Multimedia features and services using such vehicles as Session Initiation Protocol (SIP) for call control.

However, the current methods for transmitting multi-media services over packet-switched networks still do not provide the quality of service that users have come to expect from circuit-switched networks. It is desired to increase the quality of service of packet-switched networks and other networks similarly configured.

SUMMARY

A system and method is disclosed for efficient transmission of voice and data over internet protocol networks. In one embodiment, a method is provided for transmitting over packet networks. A first node detects at least one next node. A channel is created between the first node and the at least one next node. The first node receives a first packet, and the protocol of the first packet is detected. The first packet is merged with a second packet of the same protocol as the first packet, and the merged packet is sent to the next node via the channel.

In another embodiment, a internet trunking protocol node is disclosed. The node comprises a channel interface that assigns a channel to a next node. The node also has a port for transmitting and receiving a plurality of packets to and from the next node. A processor for performing instructions in response to received packets is also included in the node, along with a memory in communication with the processor. The memory is capable of storing a plurality of instructions. These instructions are responsive to the receipt of a packet. The instructions detect a protocol of the packet, merge a plurality of packets of the same protocol into a merged packet, split a packet comprised of a plurality of packets of the same protocol, and route packets according to an internet protocol.

In yet another embodiment, a method for communicating over packet networks is disclosed. An internet protocol packet is received at a node that is in communication with a plurality of nodes. The internet protocol packet is split into a plurality of ITP packets. For each of the plurality of ITP packets, a next node to which the ITP packet is to be transmitted is determined, whether the available bandwidth to the next node exceeds a predetermined threshold is determined, and a channel is assigned. If there is a second ITP packet that is to be transmitted to the next node, the second ITP packet is merged with the ITP packet.

The present invention can be implemented in many different types of networks, including but not limited to, internet protocol and multiprotocol label switching networks.

DETAILED DESCRIPTION

Various aspects of the following disclosure provide a unique method and system for transmitting packets in a communication environment. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
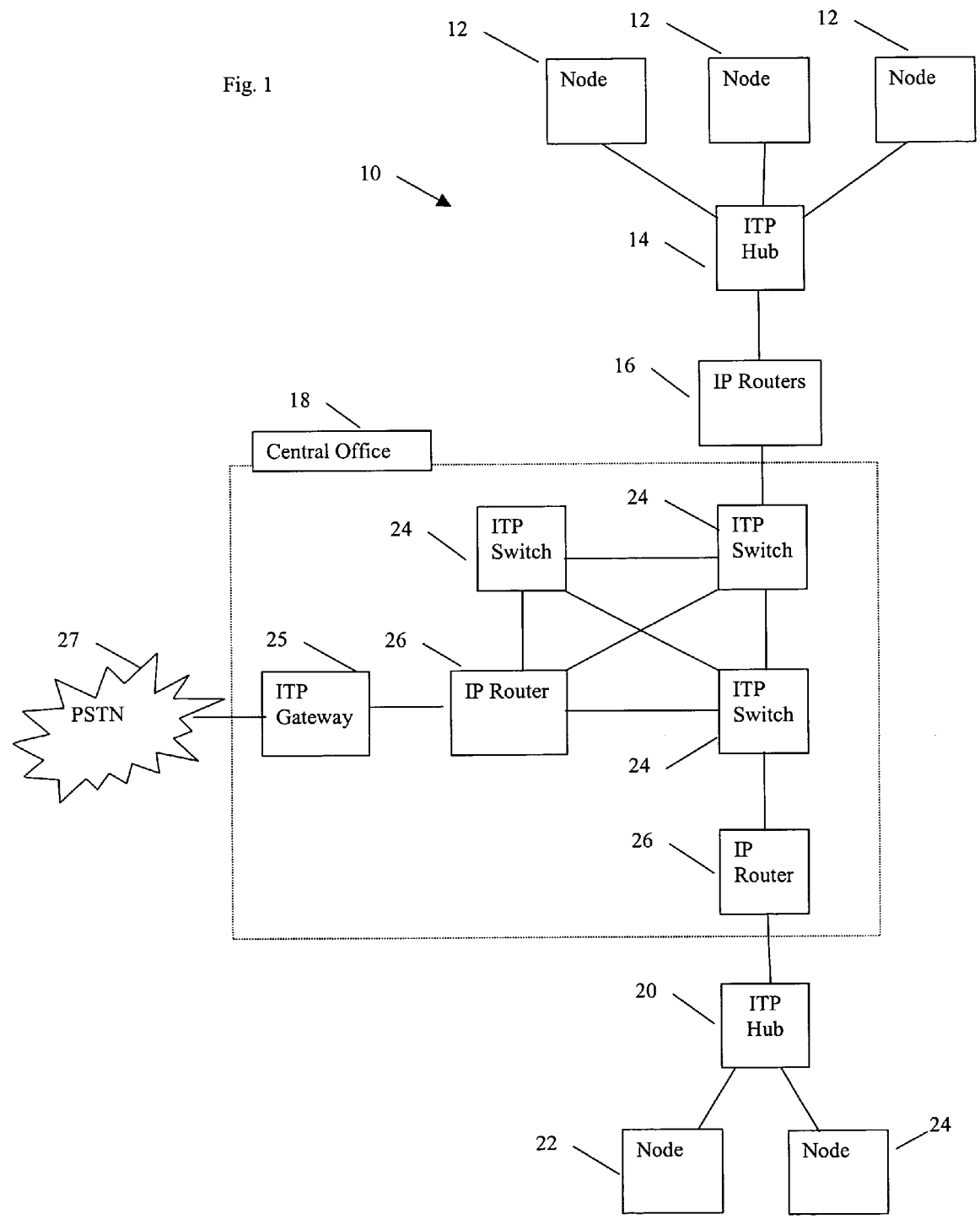
FIG. 1 is an example of a network incorporating one embodiment of the present invention.

Referring to FIG. 1, a communication system 10 is shown and depicts an example configuration of nodes and links that have been defined based on network functions. Communication system 10 can be any packet-based communication system, as well as any digital cellular system that provides services such as packet voice or voice-over-IP (VOIP) or a third generation (3G) wireless system. 3G wireless systems include multiple air interface standards, including cdma2000, Universal Mobile Telecommunications System (UMTS), Wideband CDMA (W-CDMA), Global System for Mobile Communications (GSM), and UWC-136, a TDMA-based technology. Actual implementations may contain multiple copies of these nodes within multiple networks, may merge any of these nodes into single hardware entities, or may distribute portions of the nodes among several hardware entities. The architecture of the present embodiments is designed to utilize emerging Internet standards and protocols. An example of this is the use of Session Initiation Protocol (SIP) for IMS signaling for establishing a call. Use of emerging internet-based protocols allows for the IMS to provide internet-like functionality and services to mobile units along with voice and data services.

In this particular example, communication system 10 comprises a plurality of nodes, including communication nodes 12, an internet trunking protocol (ITP) hub 14, Internet Protocol (IP) router 16, a central office 18, another ITP hub 20, and nodes 22. Each node can be selectively connected to one or more of the other nodes either directly through a physical or wireless connection, or through a plurality of intermediate nodes. The nodes and the plurality of intermediate nodes may serve to modify the connection as required, such as converting information between different packet, circuit, and/or wireless protocols.

Nodes can be any device or combination of devices that can be used to connect with a network. For example, nodes 12 can be comprised of terminal equipment and a 3G mobile unit that communicates with communication system 10 via an air interface. In another example, node 12 could be a computer in communication with communication system 10 via a wired networking protocol and a gateway.

ITP hub 14 is a node that may support many different types of packet-based communications, including voice over IP (VoIP). In one example, the ITP hub 14 may include a plurality of CDMA nodes such as Packet Data Service Nodes (PDSNs), Mobile IP Foreign Agents (FAs), Mobile IP Home Agents (HAs), and Authentication, Authorization and Accounting (AAA) Servers. In another example, ITP hub 14 may include a plurality of GSM nodes such as Serving GPRS Support Nodes (SGSNs) and Gateway Support Nodes (GGSNs). Additional or alternative nodes may be used to provide packet-switched service, as required by the type of packet-switched domain being used. In addition to handling routine packet-switch communications, ITP hubs are capable of recognizing packets that contain ITP data, and merging and unmerging ITP packets, as discussed more fully below.

In the present embodiment, ITP hub 14 is selectively coupled to nodes 12 via a wireless link, such as a 3G interface and does not necessarily have an IP address. The ITP hub may give priority to packets that it receives that are ITP packets. IP router 16 communicates with the ITP hub 14 and a central office 18. Central office 18 may comprise any number of ITP switches 24, ITP gateways 25, and/or one or more IP routers 26. Further an ITP gateway 25 could be in communication with a Public Switched Telephone Network 27.

ITP routers and ITP switches are capable of handling routine packet-switched communications, as well as internet trunking protocol communications, and may include any or all of the functionality of an ITP hub. Moreover, ITP hubs, routers, and switches are capable of detecting the existence of each other, using methods well-known to those skilled in the art.

Figure 2:
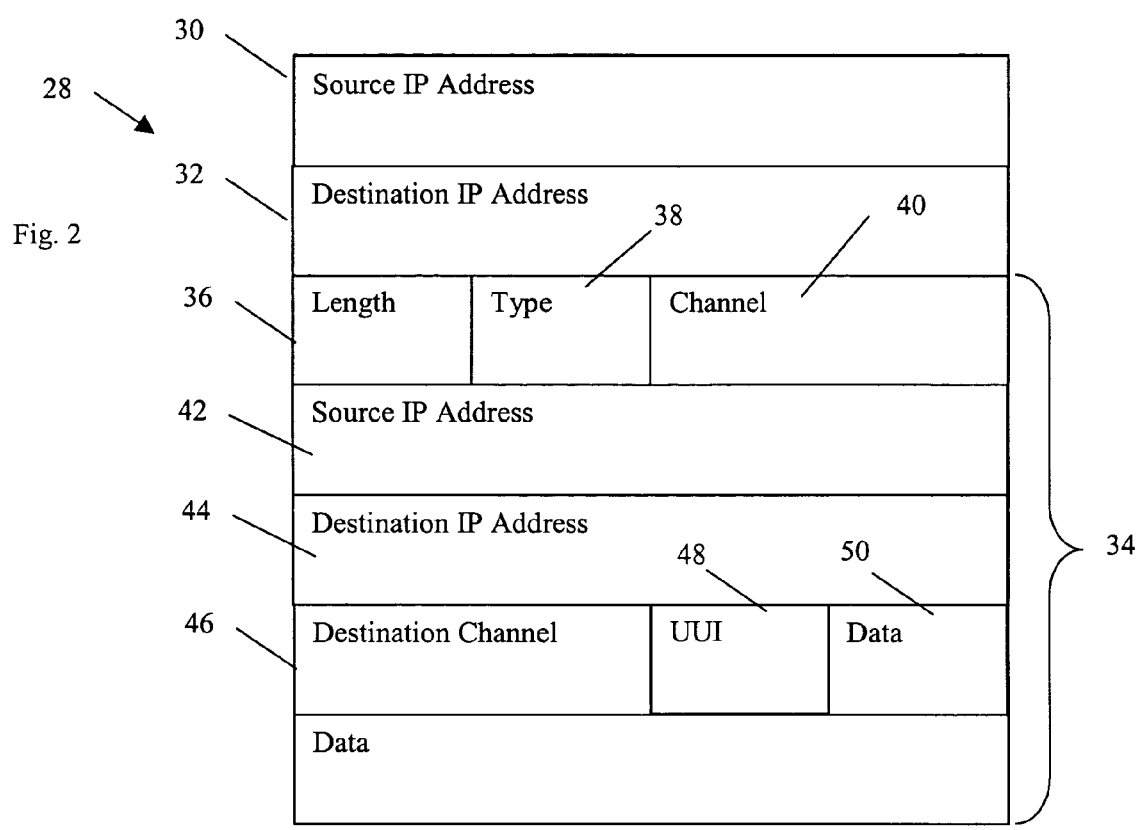
FIG. 2 is an example of an internet protocol packet incorporating an ITP packet according to one embodiment of the present invention.

Referring now to FIG. 2, is an illustration of an example IP packet 28 as used in an embodiment of the present invention. The IP packet 28 may be comprised of a source IP address field 30, a destination IP address field 32, and data field 34. It is understood that the IP packet 28 may also comprise other packet components, such as packet length, check sum values, and header length values. It is further understand that the illustration of the packet is not necessarily indicative of the actual bit length of any particular component, and that the relative sizes are not indicative of comparative bit length. Further, it also contemplates that the IP packet could be any version of the internet protocol, including IPv4 and IPv6.

Source IP address field 30 contains the IP address of the initiating node for the packet and is used to route the IP packet 28 via internet protocol. Likewise, the destination IP address field 32 contains the IP address of the destination node for the packet and is used to route the IP packet 28 via internet protocol.

The data field 34 comprises an ITP packet. The ITP packet may be comprised of a length field 36, type field 38, channel field 40, ITP source IP address field 42, ITP destination IP address field 44, destination channel field 46, UUI field 48, and data field 50.

Length field 36 contains a value that indicates the length of the ITP packet. Type field 38 indicates the type of ITP packet. Example types of ITP packets are initialization packets (e.g., type=1), far end detected packets (e.g., type=2), initialization done packets (e.g., type=3), tear down packets (e.g., type=4), and tear down complete packets (e.g., type=5). In this example, the ITP packet is a Type 1 initialization packet. A Type 2 ITP packet could have the same composition as is shown in this example. A Type 1 packet is transmitted by the initiating node to the destination node and by the destination node to the initiating node to establish a connection. A Type 2 packet is sent by the initiating node upon receipt of a Type 1 packet from the destination node.

Channel field 40 is the channel that the packet will travel along to move to the next ITP node. A channel is a virtual allocation of a predetermined amount of bandwidth between two nodes. The more bandwidth that is between two nodes, the more channels that an ITP node may create in that communication link. Once a channel is assigned, it can be stored in the channel field 40. The ITP source IP address field 42 contains the IP address of the initiating node. The ITP destination IP address 44 contains the IP address of the destination node. UUI field 48 contains the user-to-user indication field for transferring codepoint messages. Data field 50 contains the data element of the ITP packet.

Figure 3:
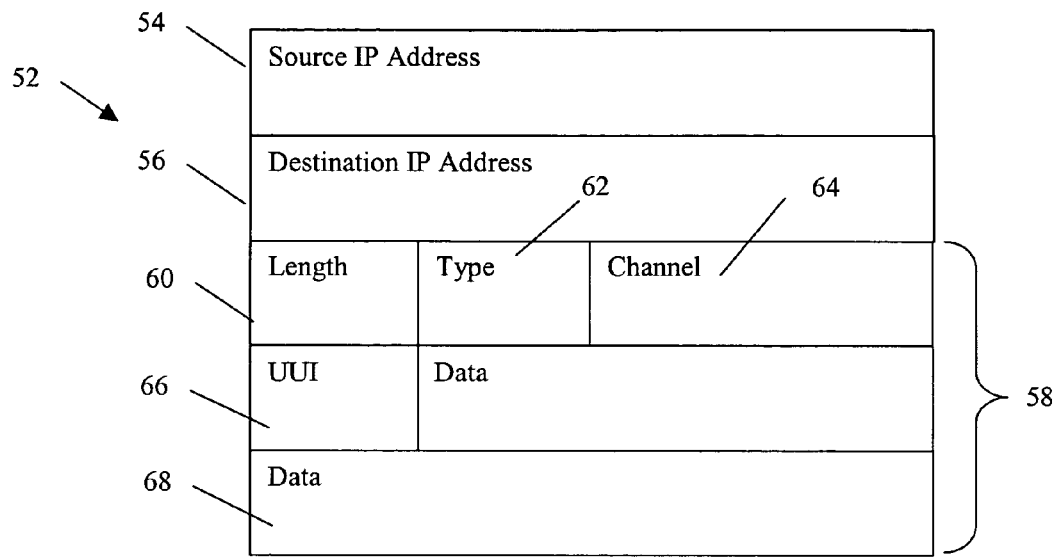
FIG. 3 is an example of an internet protocol packet incorporating an ITP packet according to one embodiment of the present invention.

Referring now to FIG. 3, is an illustration of an example IP packet 52 as used in an embodiment of the present invention. The IP packet 52 may be comprised of a source IP address field 54, a destination IP address field 56, and data field 58. It is understood that the IP packet 52 may also comprise other packet components, such as packet length, check sum values, and header length values. It is further understand that the illustration of the packet is not necessarily indicative of the actual bit length of any particular component, and that the relative sizes are not indicative of comparative bit length.

Source IP address field 54 contains the IP address of the initiating node for the packet and is used to route the IP packet 52 via internet protocol. Likewise, the destination IP address field 56 contains the IP address of the destination node for the packet and is used to route the IP packet 52 via internet protocol.

The data field 58 contains an ITP packet. The ITP packet may be comprised of a length field 60, type field 62, channel field 64, UUI field 66, and data field 68.

Length field 60 contains a value that indicates the length of the ITP packet. Type field 62 indicates the type of ITP packet. In this example, the ITP packet is a Type 3 initialization done packet. Type 3 packets are transmitted to indicate that the initialization has been completed. Type 3 packets do not require an ITP source IP address or an ITP destination IP address. As will be discussed in more detail below, the channel values can be used to indicate the path that the packet will travel, and, as a result, the source and destination addresses are not needed for the communication.

Channel field 64 is the channel that the packet will travel along to move to the next ITP node. UUI field 66 is the user-to-user indication field for transferring codepoint messages. Data field 68 is the data element of the ITP packet.

Figure 4:
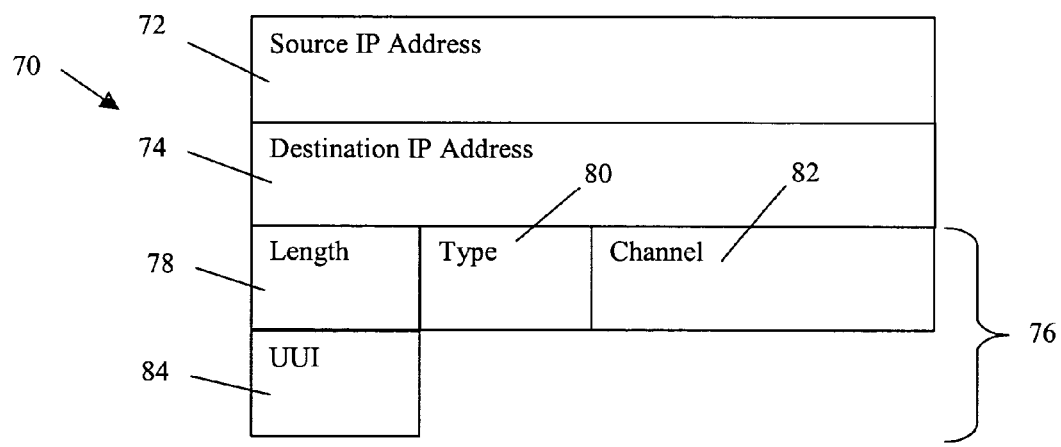
FIG. 4 is an example of an internet protocol packet incorporating an ITP packet according to another embodiment of the present invention.

Referring now to FIG. 4, is an illustration of an example IP packet 70 as used in an embodiment of the present invention. The IP packet 70 may be comprised of a source IP address field 72, a destination IP address field 74, and data field 76. It is understood that the IP packet 70 may also comprise other industry standard components, such as packet length, check sum values, and header length values. It is further understand that the illustration of the packet is not necessarily indicative of the actual bit length of any particular component, and that the relative sizes are not indicative of comparative bit length. Source IP address field 72 contains the IP address of the initiating node for the packet and is used to route the IP packet 70 via internet protocol by non-ITP nodes. Likewise, the destination IP address field 74 contains the IP address of the destination node for the packet and is used to route the IP packet 70 via internet protocol by non-ITP nodes.

The data 76 comprises an ITP packet. The ITP packet may be comprised of a length field 78, type field 80, channel field 82, and UUI field 84.

Length field 78 contains a value that indicates the length of the ITP packet. Type field 80 indicates the type of ITP packet. In this example, the ITP packet is a Type 4 tear down packet. It could also function as a Type 5 tear down complete packet. Type 4 packets are transmitted by a node that is terminating the communication to indicate that any assigned channels between the initiating node and destination node should be released. Type 5 packets are transmitted by a node that receives a Type 4 packet, indicating that the Type 4 packet was received and confirming that the communication is to be terminated. Type 4 and Type 5 packets do not require an ITP source IP address or an ITP destination IP address. As will be discussed in more detail below, the channel values can be used to indicate the path that the packet will travel, and, as a result, the source and destination addresses are not needed for the communication.

Channel field 82 is the channel that the packet travels along to move to the next ITP node. UUI field 84 is the user-to-user indication field for transferring codepoint messages.

Figure 5:
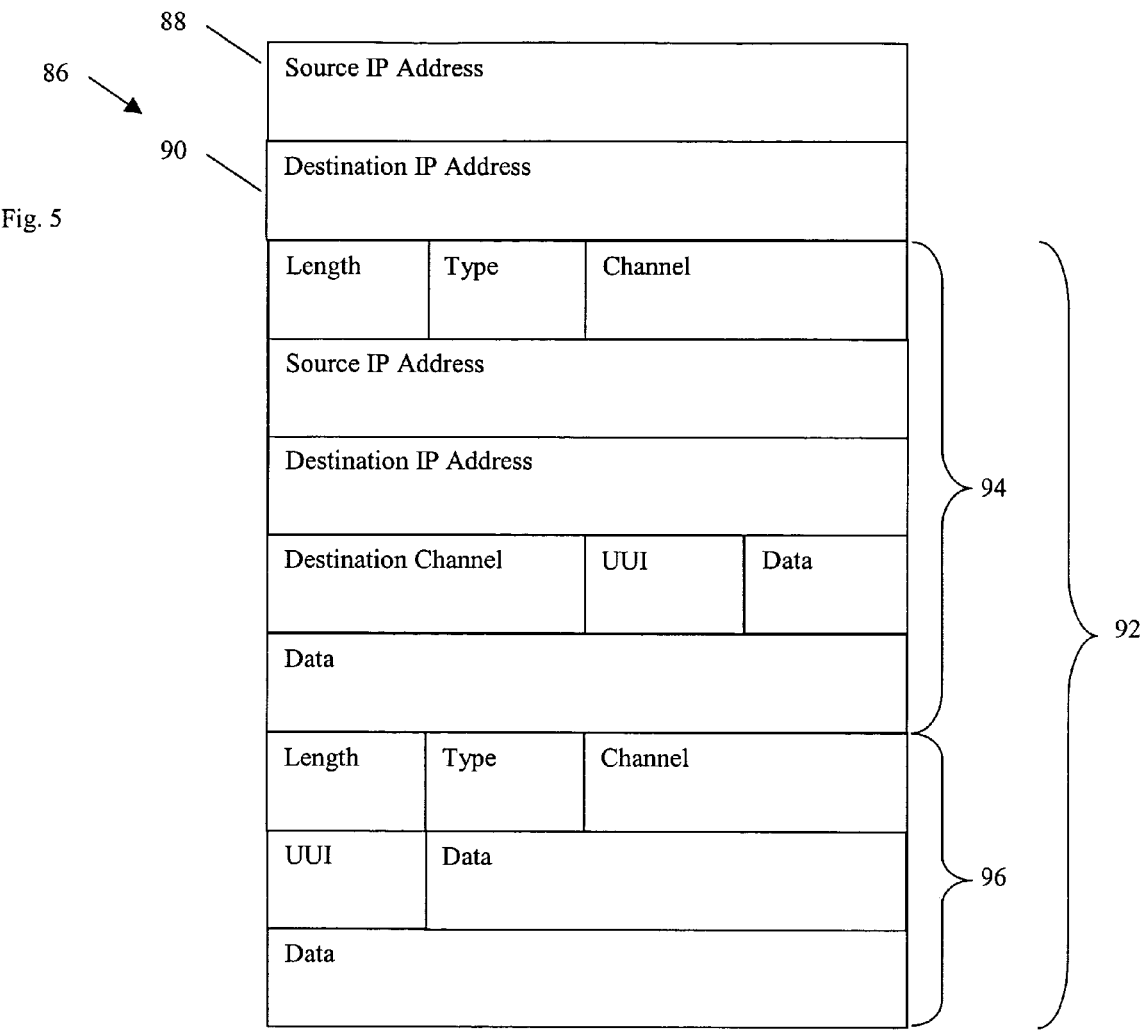
FIG. 5 is an example of an internet protocol packet incorporating two merged ITP packets according to one embodiment of the present invention.
Figure 6A:
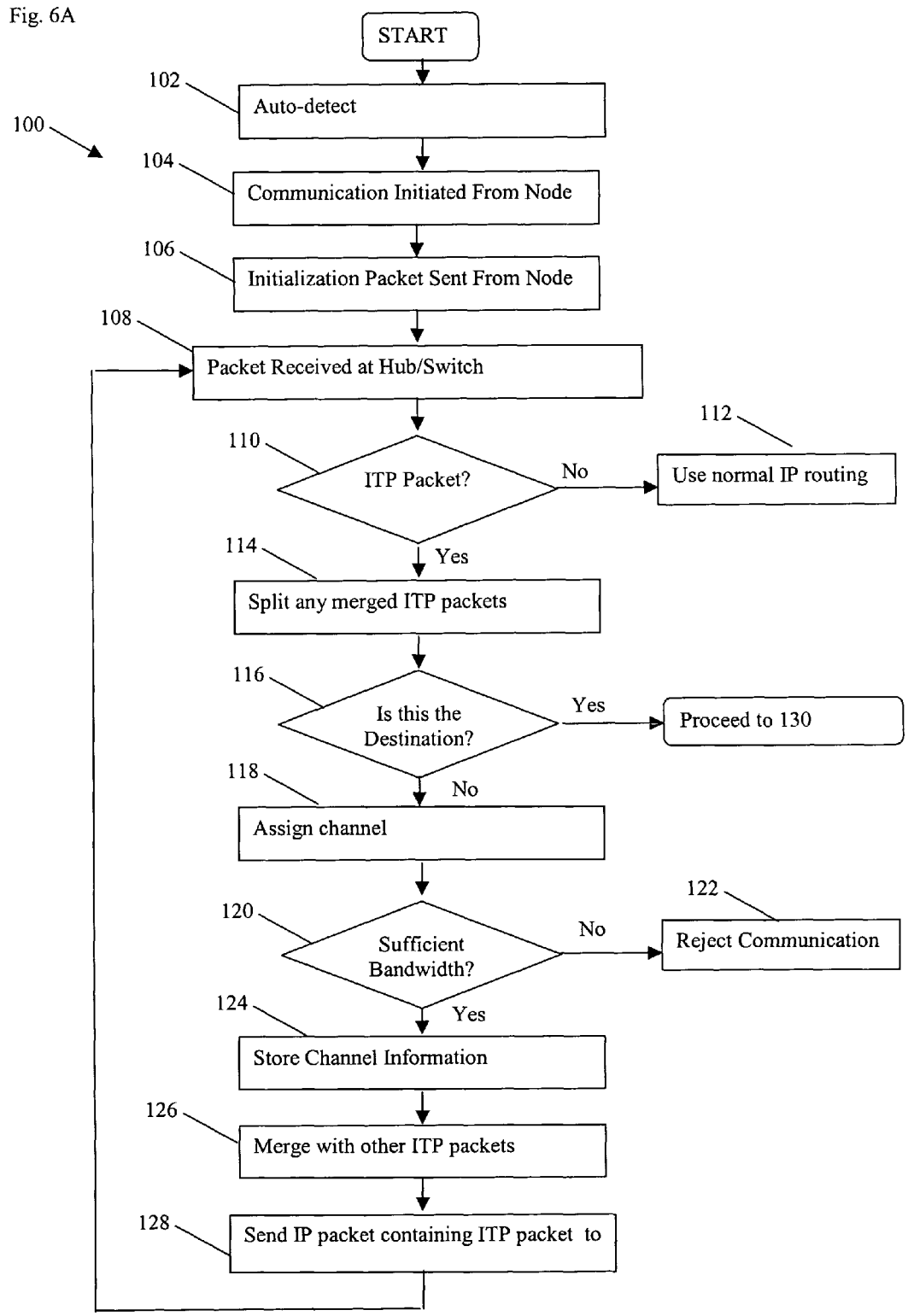
FIG. 6 is a flowchart illustrating in detail a process of one aspect of the present-invention.
Figure 6B:
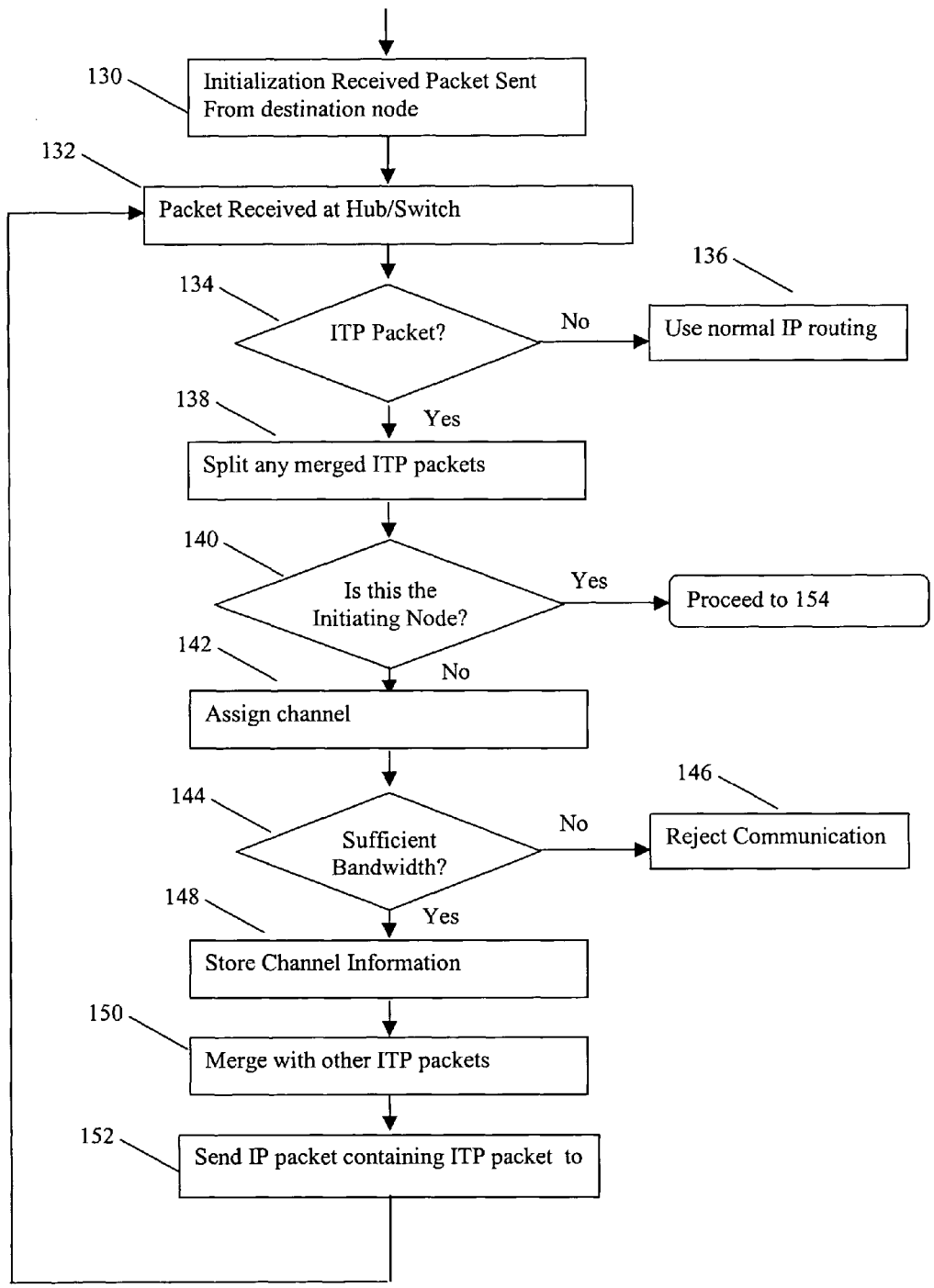
Figure 6C:
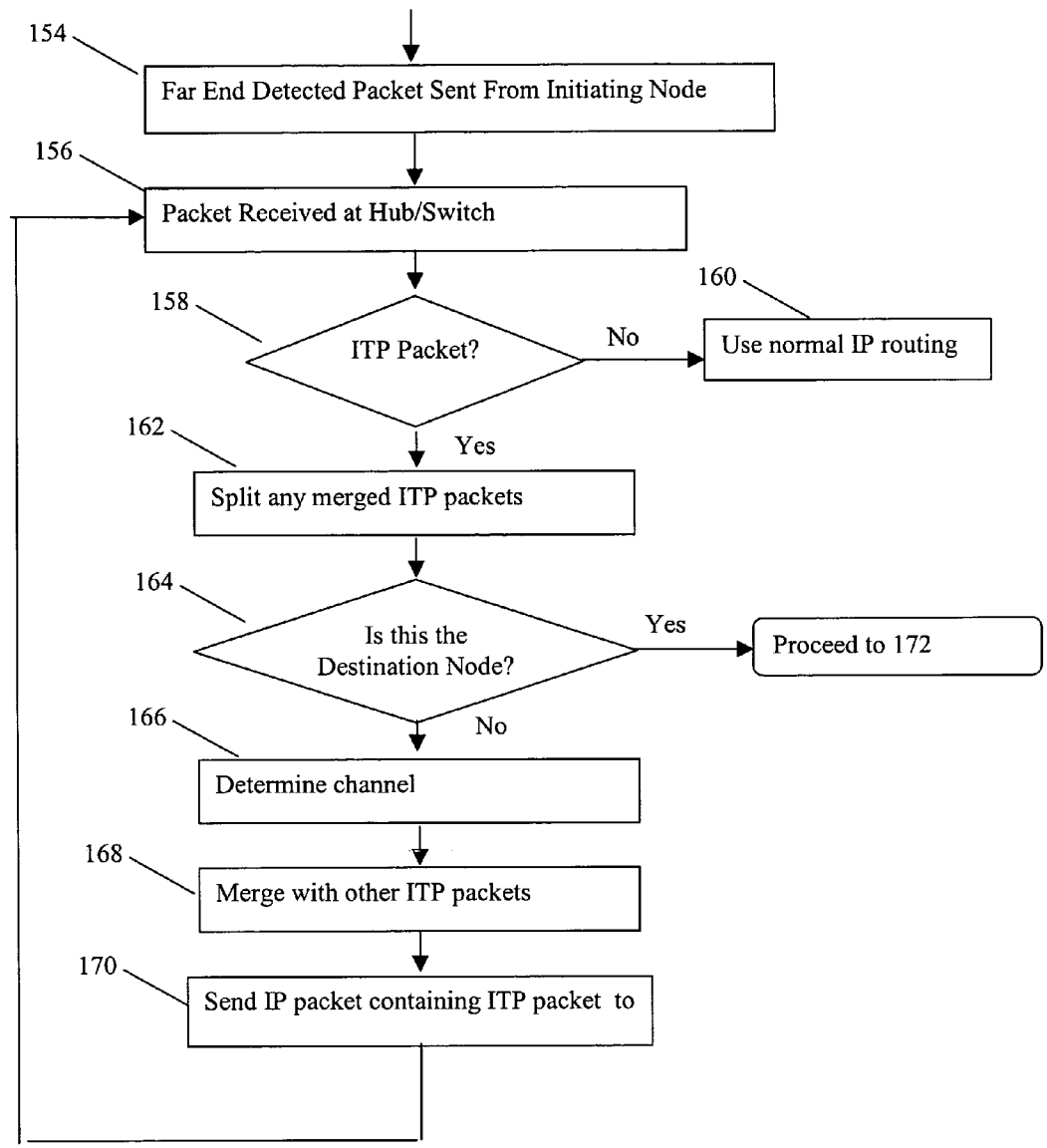
Figure 6D:
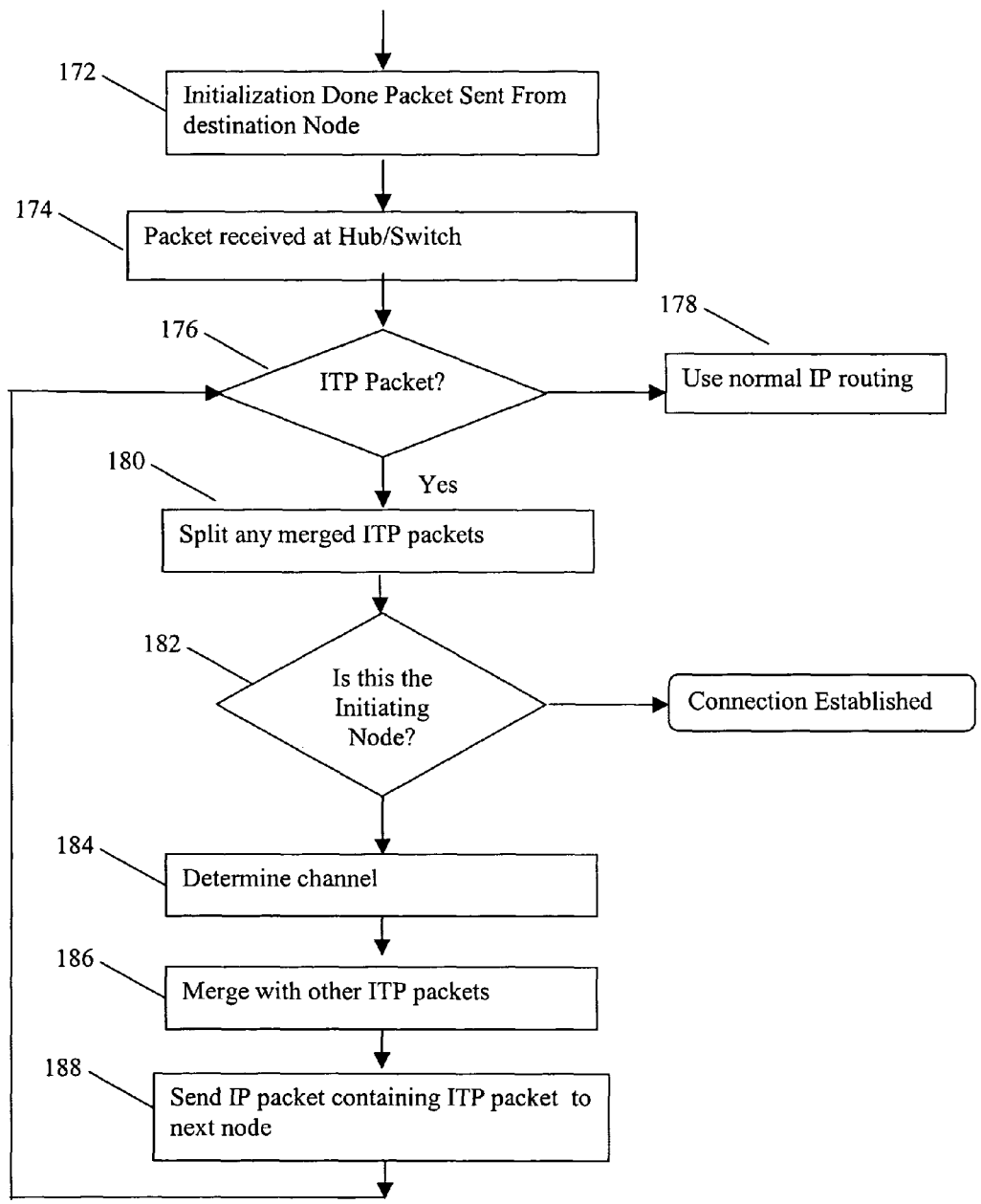

Referring now to FIG. 5, is an illustration of an example IP packet 86 that comprises two merged ITP packets in accordance with an embodiment of the present invention. The IP packet 86 may be comprised of a source IP address field 88, a destination IP address field 90, and data field 92. It is understood that the IP packet 86 may also comprise other industry standard components, such as packet length, check sum values, and header length values. It is further understand that the illustration of the packet is not necessarily indicative of the actual bit length of any particular component, and that the relative sizes are not indicative of comparative bit length. Source IP address field 88 is the IP address of the initiating node for the packet and is used to route the IP packet 86 via internet protocol. Likewise, the destination IP address field 90 is the IP address of the destination node for the packet and is used to route the IP packet 86 via internet protocol.

The data field 92 comprises two ITP packets 94, 96. While two ITP packets are shown, a plurality of ITP packets could be merged into the data field 92. Further, while this illustration depicts ITP packet 94 as a Type 1 packet (or Type 2) and ITP packet 96 as a Type 3 packet, the ITP packets could be of any or all ITP packet types.

FIG. 6 is a flowchart illustrating the process of an example embodiment of the present invention. At step 102, each ITP node in the communication system uses industry-standard IP detection to locate the nodes with which it has a direct communication link (e.g. the "next" node).

At step 104, a communication, such as a telephone call, is initiated from a node (in this example, a mobile phone is used to dial a telephone number). The communication can be any form of circuit-based information, such as video, video broadcast, voice, audio streaming, and circuit-switched data. Optionally, a control protocol, such as SIP, DTAP, or BICC could be used to initiate communication. At step 106, the node sends an initialization packet to a packet-switched network. The initialization packet may be an ITP packet embedded in the data of an IP packet. The initialization packet is to be received at the node corresponding with which the communication is to occur (the destination node), such as the mobile phone associated with the number dialed at the initiating node.

At step 108, the initialization packet is received at a node. At step 110, the node handles the packet. The node detects the protocol of the packet, and if the node is unable to do so, e.g. either the node is not ITP-enabled or the packet is not an ITP packet, then the packet is handled as a normal IP packet using normal internet protocol methods, step 112.

If the packet contains an ITP packet, then the ITP node splits any ITP packets that may have been merged into the data portion of the packet, step 114. One possible method for determining whether ITP packets have been merged into the data portion of an IP packet is to examine the length of the data of the IP packet. If the length of the data is the same as the length of the ITP packet, then no ITP packets were merged. However, if the length of the data is shorter than the length of the ITP packet, then multiple ITP packets were merged. The merged ITP packets can then be parsed according to their respective lengths, as stored in the length field of each ITP packet.

At step 116, the ITP node examines the ITP packet (or if there were multiple ITP packets, the ITP node examines each ITP packet in turn) to determine if the current node is that ITP packet's destination node. If so, the method proceeds to step 132. If the node is not the ITP packet's destination node, then the node creates a channel between the current node and the next node for that packet, step 118.

The node then determines whether there is sufficient bandwidth along that assigned channel, step 120. Sufficient bandwidth may be a predetermined threshold value that correlates to certain levels of quality of service. For data communications, the threshold value may be low, thus low bandwidth would be permissible. On the other hand, voice communications often require large amounts of bandwidth, in which case the threshold value may be high. Additionally, the predetermined threshold value may be adjusted during a communication, and in such event, a determination of sufficient bandwidth would have occur during a communication.

If the available bandwidth is less than the quality of service threshold, then the process proceeds to step 124, where the communication is rejected. When a communication is rejected the initiating node may be informed that insufficient bandwidth was available for the communication.

If sufficient bandwidth is available, the ITP node maps the assigned channel to the communication associated with the ITP packet and stores that mapping, step 124. At step 126, the ITP node then merges the ITP packet with any other ITP packets that are traveling to the same next node, and places the merged ITP packets (or single packet, as the case may be) into the data field of an IP packet. At step 128, the ITP node routes the IP packet (whether the individual packet, or the packet comprised of merged ITP packets) using normal IP methods. The process then repeats itself from step 108.

At step 130, the destination node, having received the initialization packet, transmits an initialization packet (e.g. a Type 1 packet) with its intended destination being the initiating node.

At step 132, the initialization packet is received at a node. At step 134, the node handles the packet. The node detects the protocol of the packet, and if the node is unable to do so, e.g. either the node is not ITP-enabled or the packet is not an ITP packet, then the packet is handled as a normal IP packet using normal IP methods, step 136.

If the packet contains an ITP packet, then the ITP node splits any ITP packets that may have merged into the data portion of the packet, step 138. At step 140, the ITP node examines the ITP packet (or if there were multiple ITP packets, the ITP node examines each ITP packet in turn) to determine if the current node is that packet's destination node. If so, the method proceeds to step 154. If the node is not the packet's destination node, then the node assigns to that packet the channel between the current node and the next node for that packet, step 142.

The node then determines whether there is sufficient bandwidth along that channel, step 144.

If there is insufficient bandwidth, then the process proceeds to step 146, where the communication is rejected. When a communication is rejected the initiating node may be informed that insufficient bandwidth was available for the communication.

If sufficient bandwidth is available, the ITP node maps the assigned channel to the communication associated with the ITP packet and stores that mapping, step 148. At step 150, the ITP node then merges the packet with any other ITP packets that are traveling to the same next node, and places the merged ITP packets (or single packet, as the case may be) into the data field of an IP packet. At step 152, the ITP node routes the IP packet (whether the individual packet, or the packet comprised of merged ITP packets) using normal IP methods. The process then repeats itself from step 132.

At step 154, the initiating node, having received the initialization packet from the destination node, transmits a packet indicating that the far end (e.g. the destination) was detected. At step 156, the far end detected (FED) packet (e.g. a Type 2 packet) is received at a node. At step 158, the node handles the packet. The node detects the protocol of the packet, and if the node is unable to do so, e.g. either the node is not ITP-enabled or the packet is not an ITP packet, then the packet is handled as a normal IP packet using normal IP methods, step 160.

If the packet is an ITP packet, then the ITP node splits any ITP packets that may have merged into the data portion of the packet, step 162. At step 164, the ITP node examines the ITP packet (or if there were multiple ITP packets, the ITP node examines each ITP packet in turn) to determine if the node is that packet's destination node. If so, the method proceeds to step 172. Since this particular communication has already been routed (using the initialization packet and initialization received packet), a channel has been associated with the communication. If the node is not the packet's destination node, then the node selects the channel associated with the communication, step 166. While not shown, additional checks for sufficient bandwidth could also be performed.

At step 168, the ITP node then merges the ITP packet with any other ITP packets that are traveling to the same next node, and places the merged ITP packets (or single packet, as the case may be) into the data field of an IP packet. At step 170, the ITP node routes the packet (whether the individual packet, or the packet comprised of merged ITP packets) using normal IP methods. The process then repeats itself from step 156.

At step 172, the destination node, having received the FED packet, transmits an initialization done packet (e.g. a Type 3 packet) indicating with an intended destination being the initiating node. At step 174, the initialization done packet is received at a node. At step 176, the node handles the packet. The node detects the protocol of the packet, and if the node is unable to do so, e.g. either the node is not ITP-enabled or the packet is not an ITP packet, then the packet is handled as a normal IP packet using normal IP methods, step 178.

If the packet is an ITP packet, then the ITP node splits any ITP packets that may have merged into the data portion of the packet, step 180. At step 182, the ITP node examines the ITP packet (or if there were multiple ITP packets, the ITP node examines each ITP packet in turn) to determine if the current node is that packet's destination node. If so, the communication link is established between the initiating node and destination node, and the communication data between the two nodes may be communicated using ITP packets.

If this is not the packet's destination node, then, since this particular communication has already been routed (using the initialization packet and initialization received packet), a channel has been associated with the communication. The node selects the channel associated with the communication, step 184. While not shown, additional checks for sufficient bandwidth could also be performed.

At step 186, the ITP node then merges the ITP packet with any other ITP packets that are traveling to the same next node. At step 188, the ITP node routes the packet (whether the individual packet, or the packet comprised of merged ITP packets) using normal IP methods. The process then repeats itself from step 174.

Although only a few exemplary embodiments of this invention have been described in detail above, those skilled in the art will readily appreciate that many modifications are possible in the exemplary embodiments. For example, media gateways can be part of different packet-switched networks and the handoff there-between can be an inter-network hard handoff. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A method for transmission over packet networks, the method comprising:
   detecting, at a first node, at least one next node;
   creating a channel between the first node and the at least one next node;
   receiving, at the first node, a first packet;
   detecting a protocol of the first packet;
   merging the first packet with a second packet of the same protocol as the first packet into a third packet having a protocol different from both the protocol of the first packet and the protocol of the second packet; and
   transmitting the third packet to the at least one next node via the channel.

2. The method of claim 1 wherein the first packet contains circuit-based information.

3. The method of claim 1 wherein the second packet contains circuit-based information.

4. The method of claim 1, further comprising:
   determining whether available bandwidth exceeds a predetermined threshold.

5. The method of claim 4, wherein the predetermined threshold is set to provide a minimum level of quality of service for voice communications.

6. The method of claim 4, further comprising:
rejecting a communication related to the first packet.

7. The method of claim 4, wherein the predetermined threshold is set to provide a minimum level of quality of service for data communications.

8. The method of claim 1 wherein the first node is an existing media gateway.

9. The method of claim 1 wherein the first node is connected to a circuit-switched voice network.

10. An Internet trunking protocol node comprising:
a channel interface for assigning a channel to a next node;
a port for transmitting and receiving a plurality of packets to and from the next node;
a processor for performing instructions in response to received packets; and
a memory, in communication with the processor, for storing a plurality of instructions, wherein the instructions comprise:
    instructions, responsive to the receipt of a packet, for detecting a protocol of the packet;
    instructions for merging a plurality of packets of the same protocol into a third packet having a protocol different from the protocol of the plurality of packets;
    instructions for transmitting the third packet to the next node via the assigned channel;
    instructions for splitting a packet comprised of a plurality of packets of the same protocol; and
    instructions for routing packets according to an internet protocol.

11. The internet trunking protocol node of claim 10 wherein the port is connected to a packet communications voice network.

12. The internet trunking protocol node of claim 10 wherein the port is connected to a media gateway through the packet communications voice network.

13. The internet trunking protocol node of claim 10 wherein the port is connected to a common packet communications voice network.

14. The internet trunking protocol node of claim 10 wherein at least one of the plurality of packets contains circuit-based information.

15. A method for establishing voice communication over packet networks, the method comprising:
receiving an internet protocol packet at a node in communication with a plurality of nodes;
splitting the internet protocol packet into a plurality of internet trunking protocol (ITP) packets, wherein each ITP packet of the plurality of ITP packets contains circuit-based information;
for each of the plurality of ITP packets,
    determining a next node to which the ITP packet is to be transmitted;
    determining whether available bandwidth to the next node exceeds a predetermined threshold;
    assigning a channel to the ITP packet; and
    if there is a second ITP packet that is to be transmitted to the next node, merging the second ITP packet with the ITP packet into a third packet with a protocol different from both the protocol of the ITP packet and the protocol of the second ITP packet and transmitting the third packet to the next node via the assigned channel.

* * * * *